Patented Jan. 22, 1952

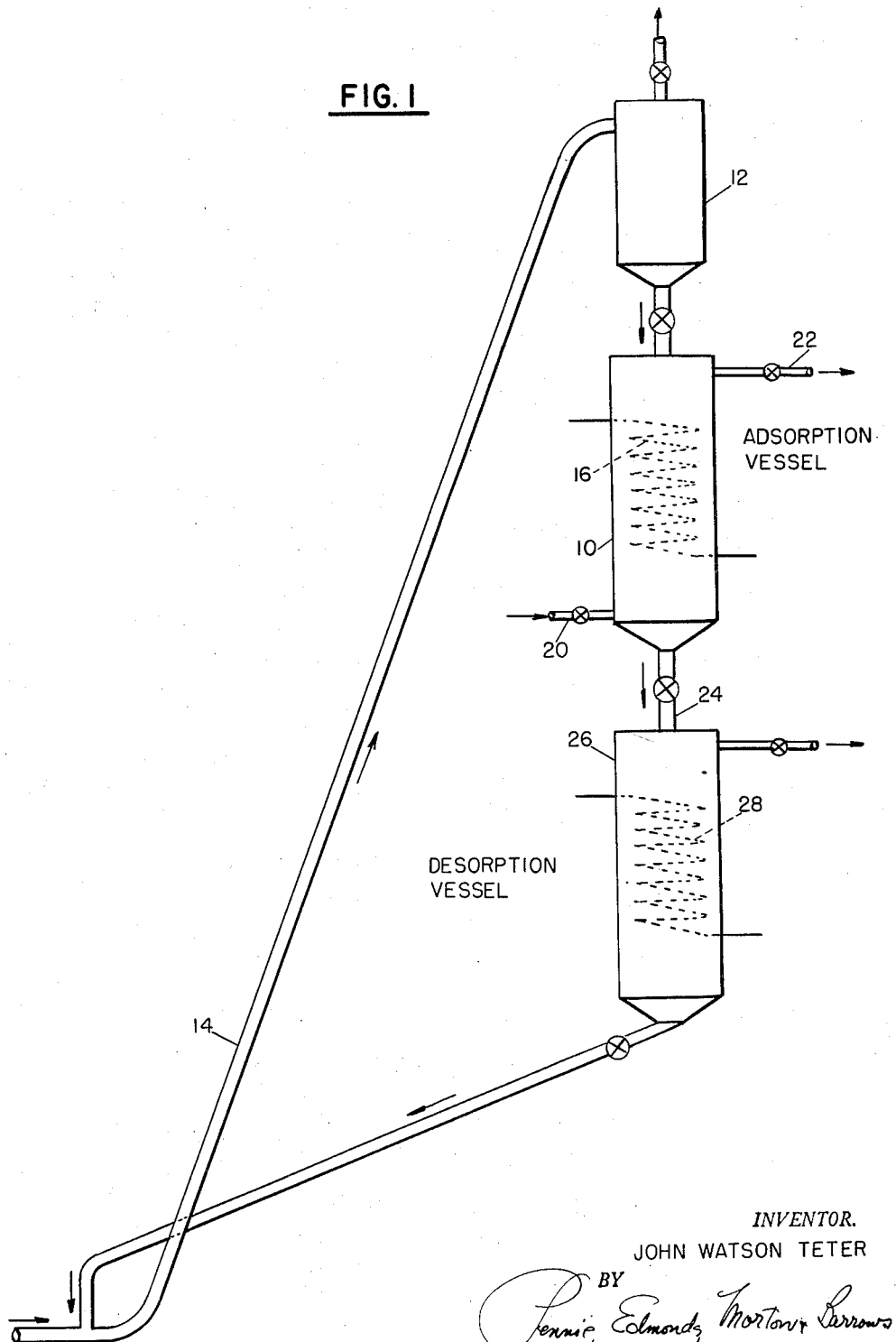

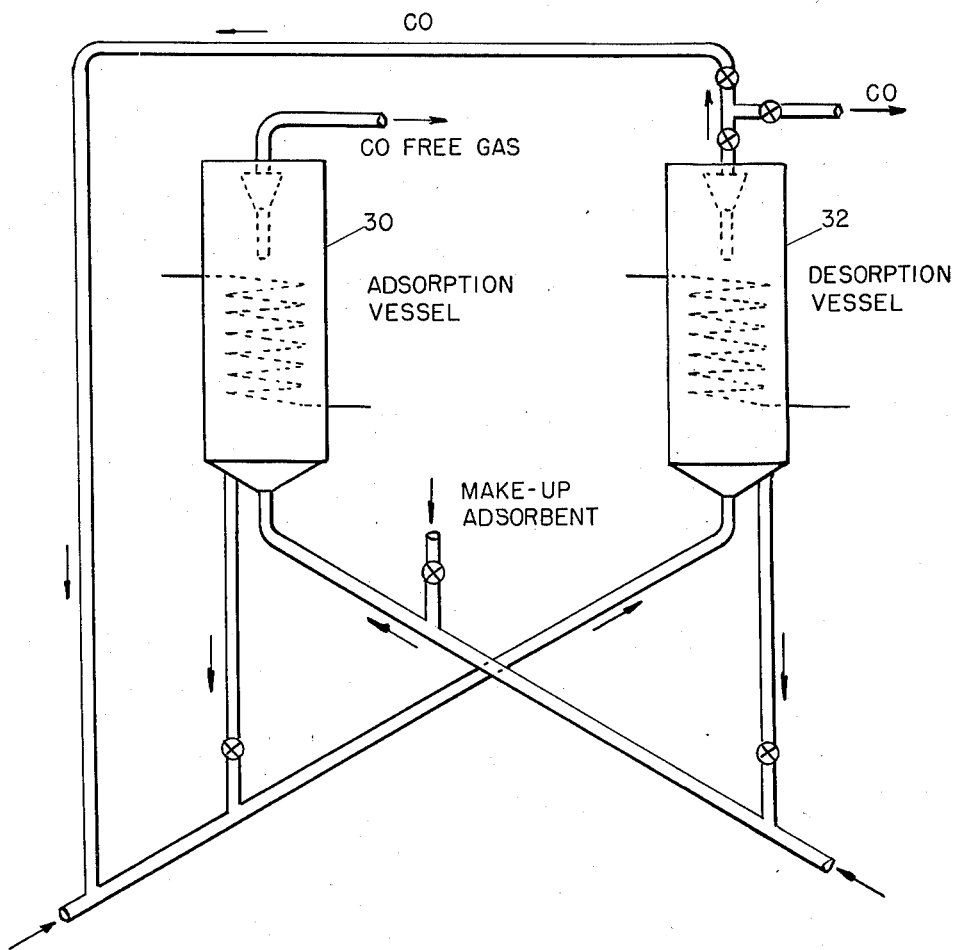

2,583,239

UNITED STATES PATENT OFFICE 2,583,239

SEPARATION OF CARBON MONOXIDE FROM GASEOUS MIXTURES

John Watson Teter, Chicago, Ill., assignor to Sinclair Refining Company, New York, N. Y., a corporation of Maine Application June 24, 1947, Serial No. 756,786

2 Claims. (Cl. 183—114.2)

This invention relates to improvements in the concentration of carbon monoxide from mixtures containing the same, in particular, mixtures of carbon monoxide and hydrogen or other gases with which carbon monoxide is commonly associated as for example, water gas, Fischer-Tropsch synthesis gas, and the like. Most processes for the production of carbon monoxide result in its production in admixture with large proportions of other gases such as hydrogen, carbon dioxide, nitrogen, etc. For use of carbon monoxide in many chemical reactions, it is desirable to have the carbon monoxide in concentrated form with at most small proportions of other gases; and the present invention relates to an improved process for this concentration or purification of carbon monoxide.

In accordance with the present invention, carbon monoxide is separated from hydrogen or other associated gases by selective adsorption on adsorbents comprising reducible metals such as iron, cobalt, nickel, copper, ruthenium, molybdenum, tungsten, or the like, supported on a suitable supporting material, advantageously a porous material, such as diatomaceous earth, argillaceous earth, silica gel, or the like, which adsorbents have been treated to reduce their capacity to adsorb hydrogen and thus make them selective with respect to carbon monoxide adsorption, followed by desorption of the carbon monoxide. The process is thus a cyclic one involving adsorption of the carbon monoxide with the appropriate adsorbent material in the presence of the gases admixed with the carbon monoxide at its source followed by desorption of the carbon monoxide by appropriate change in conditions, the process thus being a cyclic one.

In carrying out the process, the adsorbent material may be handled as a moving bed, either in granular form or in fluidized form, being passed first through a vessel in which it is brought into countercurrent contact with the admixed gases from which separation of the carbon monoxide is desired, followed by passage through a second vessel for the removal of the adsorbed carbon monoxide and in effect the regeneration of the adsorbent material for return to the cycle of operation.

The materials which are used as adsorbents in accordance with the invention are the reduced forms of such reducible metals as iron, cobalt, nickel, copper, ruthenium, molybdenum, tungsten, and the like, supported on a suitable porous material of a nature in general corresponding to the reduced metals which are commonly used as catalysts for various operations such as the Fischer-Tropsch synthesis, hydrogenation operations and the like, except that to destroy or minimize the capacity of the materials to adsorb hydrogen, the adsorbent is deliberately treated with a material which acts as a poison and reduces the capacity of the material to adsorb hydrogen and increases its capacity to selectively adsorb carbon monoxide. Suitable agents for this purpose include sulfur compounds such as hydrogen sulfide, mercaptans, sulfides, elementary sulfur, thiophenes, other organic sulfur compounds, halogen compounds, e. g., sodium chloride, and ammonia. Halogen compounds and metals of groups 1 and 2 of the periodic table serve as promoters to improve the selectivity of the adsorbent with respect to its capacity to adsorb carbon monoxide to the exclusion of hydrogen.

In general, the adsorbents are prepared by methods commonly used for the preparation of the reduced metal catalysts that is, precipitation of the metal forming solution of soluble salt by caustic soda, soda ash, or the like, in the presence of the porous support such as diatomaceous earth, silica gel or the like followed by calcining of the dried product to convert the metal to the oxide, with subsequent reduction with hydrogen to reduce the metal. Depending upon the system of handling the adsorbent selected, that is, whether it is to be used as a moving bed with the catalyst in the form of granules, or as a fluidized bed with the adsorbent in the form of a relatively finely divided powder, the treatment of the material after drying the product resulting from the precipitation of the metal on the carrier will involve grinding and/or pelleting followed by calcining and reduction. In general, if the adsorbent is to be used in the form of fluidized bed it will advantageously have a particle size of about 60 to 300 mesh, and will ordinarily be reduced to this physical form by grinding before calcining and reducing, although, to properly control its density it may be compressed or pelleted prior to the grinding to final size.

The treatment of the adsorbent to destroy or largely reduce its capacity to adsorb hydrogen merely involves exposure to suitable material, such as a sulfur compound or sulfur, advantageously brought into contact with it in vapor or gaseous form. The amount of sulfur compound required is not large, the adsorption by the adsorbent material of as little as 1% of the sulfur compound, calculated as sulfur, being effective to radically reduce or destroy the capacity of the material to adsorb hydrogen. Where ammonia, for example, is used to destroy or reduce the capacity of the material to adsorb hydrogen, a somewhat different procedure is required because, in general, the operation of removing the adsorbed carbon monoxide in the desorption step commonly involves the removal of the ammonia, in contrast with the behavior of the material when sulfur or a sulfur compound is used, such material being tenaciously held by the adsorbent. With ammonia therefore, it is advantageous to supply it in admixture with the carbon monoxide and hydrogen mixture from which the carbon monoxide is to be concentrated or purified. Where ammonia is used, the final product obtained will be a mixture of concentrated carbon monoxide and ammonia. Of course, the ammonia may be removed by washing or in other ways, or in certain instances the resulting product may be used as a mixture as, for example, in processes in which carbon monoxide and ammonia are co-reactants, as in the production of amides and nitriles in the reaction with olefins. Halogen compounds, such as chloride, for example, sodium or potassium chloride, in quantities ranging up to 1%, are effective in providing the required selectivity, and may be readily incorporated in the material.

The carrying out of the adsorption and desorption operations is not dissimilar, from the standpoint of physical manipulation, from adsorption and desorption procedures which have heretofore been used, for example, in the removal of hydrocarbons from mixtures thereof with hydrogen or the removal of hydrocarbons heavier than methane from natural gas or the like, with the use of charcoal, the removal of solvents from air or gas streams with the use of charcoal, silica gel, or other adsorbents and the like. The adsorption step is advantageously carried out under increased pressure ranging from 40 to 300 lbs. or somewhat higher and at relatively low temperatures, for example, from 60 to 200° F., although somewhat higher or lower temperatures can be used. For desorption, low pressures, such as atmospheric or even sub-atmospheric pressures, may be used, the temperature of the mass may be raised, for example, to 100 to 600° F., and if desired, the mass carrying the adsorbed carbon monoxide may be subjected to steaming, or the like, to promote the removal of carbon monoxide from the catalyst. As previously pointed out, advantageous operations involve handling the material as a moving bed of granular catalyst or as a fluidized bed. Apparatus for carrying out the process of the invention by these means are illustrated diagrammatically in the attached drawings, in which Figure 1 illustrates apparatus which may be used for the moving bed type of operation, and Fig. 2 represents apparatus which may be used for the fluidized bed type of operation.

In the apparatus illustrated in Fig. 1, there is provided an elongated adsorption vessel 10, with a hopper 12, at the top through which the adsorbent material consisting of the reduced reducible metal on the porous carrier in granular form is supplied by the gas lift 14, which lift must be operated by an inert gas, such as flue gas, or gas to be treated, or effluent from top of the treater, or the like, in view of the pyrophoric nature of the adsorbent. Cooling tubes 16 are provided within the adsorber to control the temperature in view of the high heat of adsorption of the carbon monoxide. The adsorbent material passes downwardly through the vessel, its flow being controlled in the usual way for downwardly moving beds of granular material. The mixture containing carbon monoxide, hydrogen and other gases from which it is desired to concentrate or purify the carbon monoxide is introduced at the bottom of the tower through the inlet 20, the pressure within the column being maintained at from 40 to 300 lbs. and the temperature between 60 and 200° F., advantageously toward the lower part of this range. The hydrogen and gases other than carbon monoxide, leave the top of the vessel through the outlet 22, while the adsorbent material with adsorbed carbon monoxide passes through the conduit 24 at the bottom of the tower to the top of the desorbing tower 26. The mechanical arrangement for the passage of the granular material through this is conventional. The desorbing tower is provided with heating tubes 28, which may be heated by the feed gas, if it is generated at a relatively high temperature as is the case with synthesis gas or water gas, or other sources of heat may be used. Advantageously the temperature of the material is raised from 100 to 600° F. ordinarily to a temperature substantially higher than that used in the adsorbing tower. The pressure in the desorbing tower is reduced as compared with the adsorbing tower and advantageously will range from about 2 lbs. absolute to atmospheric, although if temperatures in the higher range are used, somewhat higher pressures may be used. In some cases, it is advantageous to introduce steam into the desorbing tower to assist in the removal of the carbon monoxide from the adsorbent, but ordinarily this is not necessary.

If ammonia is used, to reduce the capacity of the adsorbent material to adsorb hydrogen, it will be advantageously introduced in admixture with the gas stream feed to the adsorbent tower.

The granular adsorbent material is discharged from the bottom of the desorbing tower through a conventional discharge device to the gas lift 14 by which it is lifted to the hopper at the top of the adsorbing tower.

In the apparatus illustrated in Fig. 2, the adsorbent material is handled in the form of a fluidized bed, the apparatus being similar to conventional apparatus for the use of powdered materials as fluidized catalysts, the adsorption being carried out in the vessel 30 and the desorption in the vessel 32. The adsorbent material carrying carbon monoxide discharged from the vessel 30 is transferred to the desorbing vessel with the use of recycled carbon monoxide as a carrier, while the material from which the carbon monoxide has been removed in the desorbing vessel is returned to the adsorbent using the gas stream from which the carbon monoxide is to be concentrated or purified as a carrier. As in the apparatus of Fig. 1, suitable heating and cooling means are provided in the adsorbing and desorbing chambers to provide appropriate temperature control and the pressures are maintained within about the same levels described in connection with the moving bed type of apparatus.

One important factor in the practice of the present invention is the use of sulfur-free gas mixtures. Thus, if the gas mixture from which the carbon monoxide is to be concentrated or purified contains any significant quantity of sulfur, it should be subjected to a suitable desulfurizing operation before being brought into contact with the adsorbent material. Even where sulfur or a sulfur compound is used to treat the adsorbent material to destroy or reduce its capacity to adsorb hydrogen from the gas mixture, it is important to avoid bringing more sulfur into contact with the adsorbent material because adsorption of additional sulfur tends to reduce the adsorption capacity of the reducible metal to a point where it does not efficiently adsorb carbon monoxide. While the use of appropriate small quantities of sulfur or sulfur compounds in controlled amounts as described, can effectively result in a material which selectively adsorbs carbon monoxide and has a greatly reduced capacity for adsorbing hydrogen, further adsorption by the material of sulfur, as, for example, by its use with a sulfur-containing water or synthesis gas, results in inhibition of its capacity to adsorb carbon monoxide and, therefore, destroys its usefulness as a selective adsorbent in the herein described process.

I claim:

1. The process of separating carbon monoxide from gaseous mixtures containing the same which comprises bringing the gaseous mixture into contact with a selective adsorbent for the carbon monoxide comprising a reduced metal supported on a porous carrier, said reduced metal having been pretreated with an agent selected from the group consisting of hydrogen sulfide, mercaptans, sulfides, sulfur, and thiophenes, which substantially reduces its capacity to adsorb hydrogen, then removing the adsorbed carbon monoxide from the adsorbent.

2. The process of separating carbon monoxide from gaseous mixtures containing the same which comprises bringing the gaseous mixture into contact with a selective adsorbent for the carbon monoxide comprising a reduced metal supported on a porous carrier, said reduced metal having been pretreated with sulfur which substantially reduces its capacity to adsorb hydrogen, then removing the adsorbed carbon monoxide from the adsorbent.

JOHN WATSON TETER.

REFERENCES CITED

The following references are of record in the file of this patent:

UNITED STATES PATENTS

| Number | Name | Date |
|---|---|---|
| 1,422,007 | Soddy | July 4, 1922 |
| 1,939,647 | Arnold et al. | Dec. 19, 1933 |
| 2,254,799 | Erdmann | Sept. 2, 1941 |
| 2,293,901 | Hutchinson | Aug. 25, 1942 |
| 2,398,899 | Teter | Apr. 23, 1946 |

FOREIGN PATENTS

| Number | Country | Date |
|---|---|---|
| 560,036 | Great Britain | Mar. 16, 1944 |